United States Patent
Wu et al.

(10) Patent No.: US 10,904,501 B2
(45) Date of Patent: Jan. 26, 2021

(54) PROJECTION SYSTEM AND KEYSTONE CORRECTION METHOD

(71) Applicant: Coretronic Corporation, Hsin-Chu (TW)

(72) Inventors: Yu-Chi Wu, Hsin-Chu (TW); Pei-Yu Li, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/595,494

(22) Filed: Oct. 8, 2019

(65) Prior Publication Data

US 2020/0120319 A1    Apr. 16, 2020

(30) Foreign Application Priority Data

Oct. 16, 2018  (CN) .......................... 2018 1 1200316

(51) Int. Cl.
*G03B 21/14* (2006.01)
*H04N 9/31* (2006.01)

(52) U.S. Cl.
CPC ......... *H04N 9/3185* (2013.01); *G03B 21/147* (2013.01); *H04N 9/317* (2013.01)

(58) Field of Classification Search
CPC ...... G03B 21/147; G03B 21/14; H04N 9/317; H04N 9/3185; H04N 9/3194
See application file for complete search history.

(56) References Cited

U.S. PATENT DOCUMENTS

| | | | |
|---|---|---|---|
| 2004/0227830 A1* | 11/2004 | Kobayashi | H04N 9/317 348/294 |
| 2005/0046804 A1 | 3/2005 | Akutsu | |
| 2005/0157270 A1 | 7/2005 | Muraoka et al. | |

(Continued)

FOREIGN PATENT DOCUMENTS

| | | |
|---|---|---|
| CN | 101470246 | 12/2010 |
| CN | 106331549 | 1/2017 |
| CN | 108024101 | 5/2018 |

(Continued)

OTHER PUBLICATIONS

Mochizuki et al.; JP2005-295328A, Machine Translation in English (Year: 2005).*

(Continued)

*Primary Examiner* — Ryan D Howard
(74) *Attorney, Agent, or Firm* — JCIPRNET (57) ABSTRACT

A projection system and a keystone correction method are provided. The projection system includes: a projector projecting an image to a projection zone; an image capturing device capturing a captured image including the projection zone; and a processor. The processor divides the captured image into multiple focusing zones, and controls a stepper motor to shift focusing on the focusing zones at edges to obtain a step of the stepper motor and a distance for each of the focusing zones with a maximum clarity value. The distance is a projection distance between a lens module and the focusing zone. The processor calculates an included angle between the direction of a light axis of the projector and the projection zone according to the distances of the focusing zones at the edges, and performs a warping operation on a projection image according to the included angle.

12 Claims, 9 Drawing Sheets

(56) References Cited

U.S. PATENT DOCUMENTS

2010/0214540 A1* 8/2010 Sajadi .................. G03B 3/00
353/101
2018/0120560 A1 5/2018 Wang et al.

FOREIGN PATENT DOCUMENTS

JP        2005295328     10/2005
TW      200735661      9/2007

OTHER PUBLICATIONS

"Search Report of Europe Counterpart Application", dated Mar. 10, 2020, p. 1-p. 9.

* cited by examiner

PROJECTION SYSTEM AND KEYSTONE CORRECTION METHOD

CROSS-REFERENCE TO RELATED APPLICATION

This application claims the priority benefit of China application serial no. 201811200316.X, filed on Oct. 16, 2018. The entirety of the above-mentioned patent application is hereby incorporated by reference herein and made a part of this specification.

BACKGROUND OF THE INVENTION

1. Field of the Invention

The invention relates to a projection system and a keystone correction method, and more particularly, to a projection system and a keystone correction method for automatically correcting projection image.

2. Description of Related Art

Figure 1A:
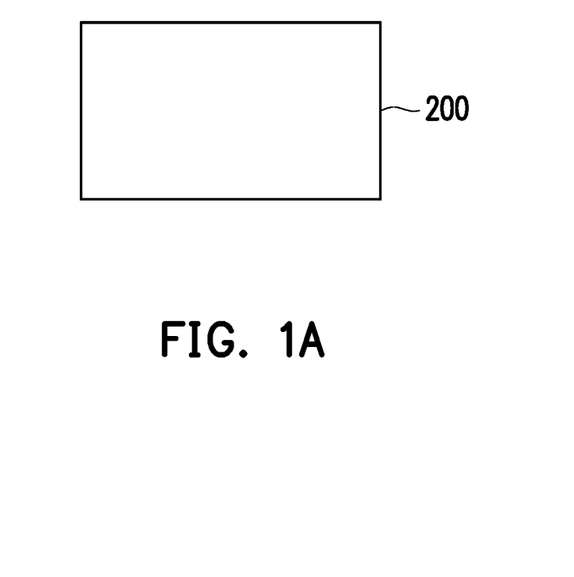
FIGS. 1A to 1D are schematic diagrams of the conventional projector in a horizontal rotation and the projection image.
Figure 1B:
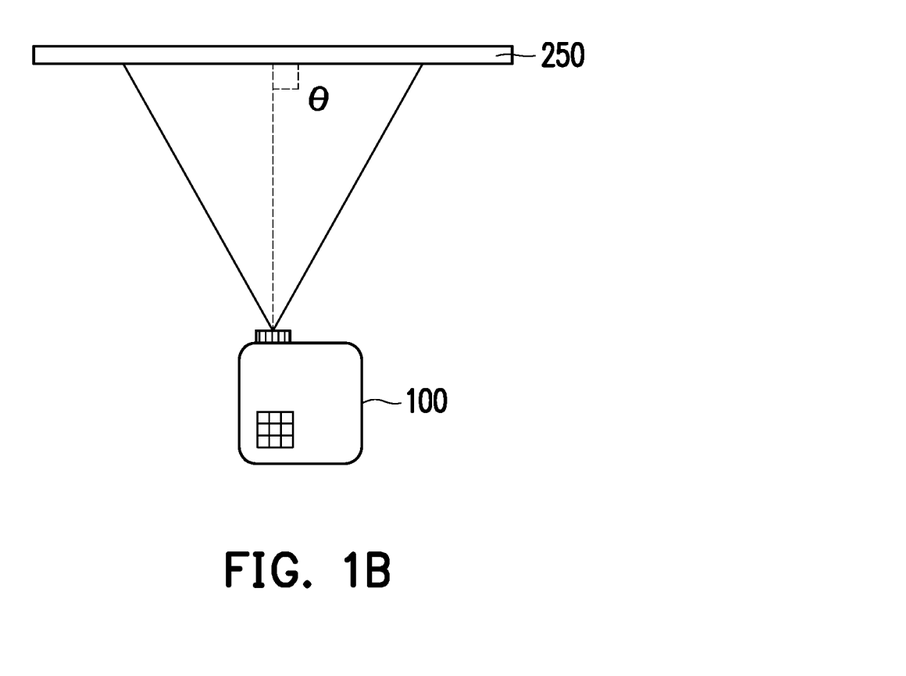
Figure 1C:
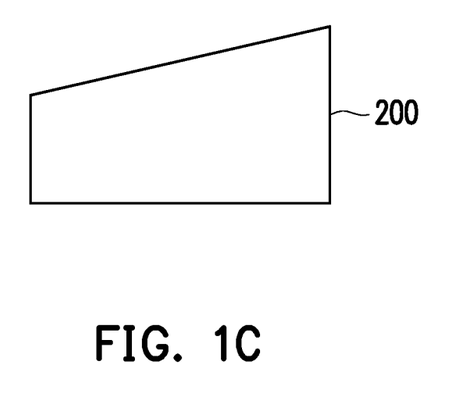
Figure 1D:
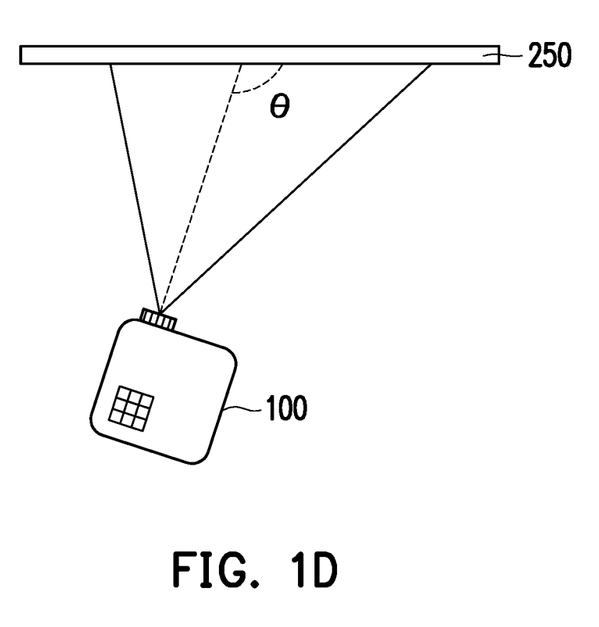

While a projector is projecting a projection image on a projection screen, horizontally rotating the projector leftward or rightward will cause the projection image to change from a rectangle to a trapezoid. As shown by FIGS. 1A to 1D, if a projector 100 is horizontally rotated leftward, a projection image 200 becomes a trapezoid with a short left side and a long right side. FIG. 1A is a schematic diagram of the projection image 200 when a projection angle $\theta$ is 90 degrees in both a top view and a side view. FIG. 1B is the top view corresponding to FIG. 1A. FIG. 1C is a schematic diagram of the projection image 200 when the projection angle $\theta$ is not 90 degrees in the top view. FIG. 1D is the top view corresponding to FIG. 1C. For the problem that the projection image 200 in FIG. 1C becomes a horizontal trapezoid, the user normally needs to manually adjust the projection image 200 to the rectangle through visual judgment by using functions in a horizontal keystone correction. It should be noted that, the projection angle $\theta$ in FIG. 1B and FIG. 1D represents a horizontal included angle between a direction of a light axis of a lens module of the projector 100 and a projection screen 250 (i.e., an included angle in the top view).

Figure 2A:
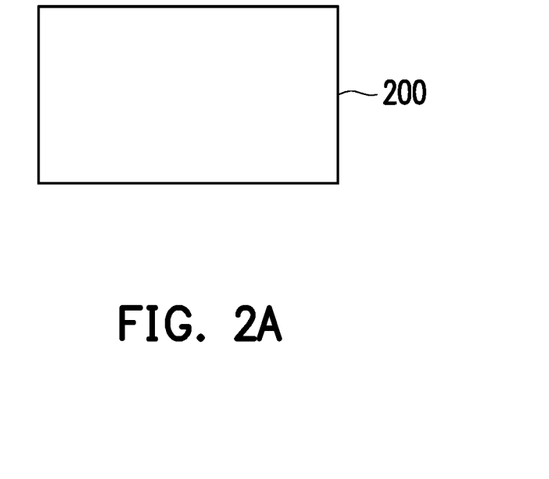
FIGS. 2A to 2D are schematic diagrams of the conventional projector in a vertical rotation and the projection image.
Figure 2B:
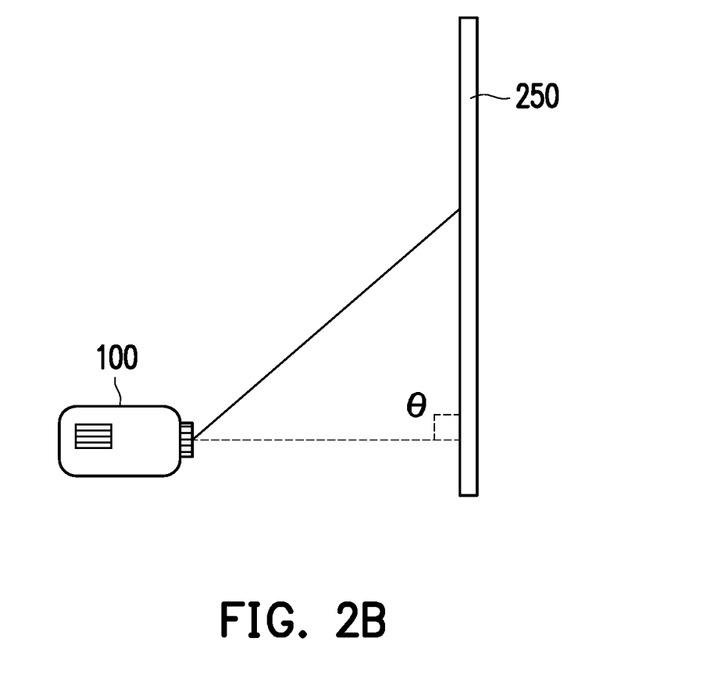
Figure 2C:
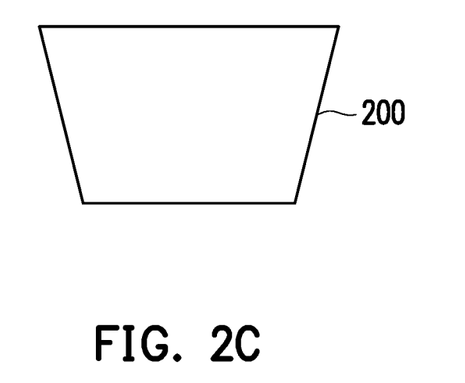
Figure 2D:
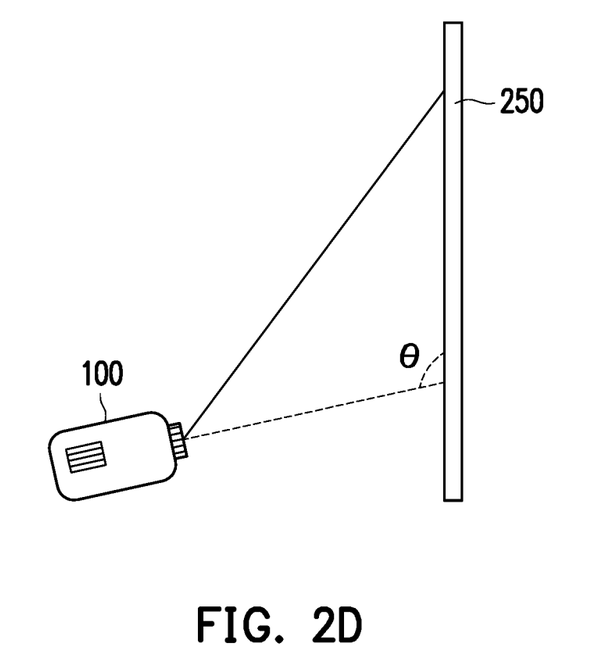

While the projector is projecting the projection image on the projection screen, vertically rotating the projector upward or downward will also cause the projection image to become a trapezoid. As shown by FIGS. 2A to 2D, if the projector 100 is vertically rotated upward, the projection image 200 becomes trapezoid with a short lower side and a long upper side. FIG. 2A is a schematic diagram of the projection image 200 when the projection angle $\theta$ is 90 degrees in both a top view and a side view. FIG. 2B is the side view corresponding to FIG. 2A. FIG. 2C is a schematic diagram of the projection image 200 when the projection angle $\theta$ is not 90 degrees in the side view. FIG. 2D is the side view corresponding to FIG. 2C. For the problem that the projection image 200 in FIG. 2C becomes a vertical trapezoid, an included angle between the projector 100 and the ground is usually detected by a gravity sensor (G-Sensor). In the case where the projection screen is perpendicular to the ground, the projection angle $\theta$ can be easily calculated so corresponding functions in a vertical keystone correction can be performed. It should be noted that, the projection angle $\theta$ in FIG. 2B and FIG. 2D represents a vertical included angle between the direction of the light axis of the lens module of the projector 100 and the projection screen 250 (i.e., an included angle in the side view).

In general, during installation, the projector is placed by using the best projection angle possible (e.g., for allowing the projection angle to be perpendicular to the projection screen), which is selected to make the projection image a rectangle. However, as limited by space issues, sometimes it is required to place the projector in a tilted manner. In this case, the user needs to correct the problem of image deformation in order to obtain the correct projection image.

In addition, for the horizontal keystone correction or the vertical keystone correction, a measurement for distances from a lens of the projector to the left side and the right side of the projection image may be performed by using two distance measuring modules (e.g., laser, ultrasonic or infrared modules). However, a measurement range of the laser module is too short to meet the practical application distance of the projector that normally projects from the front side. The ultrasonic or infrared modules are too large to be adapted to a small projector. Therefore, how to automatically correct the projection image without setting additional components is a goal that those skilled in the art should strive for.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a projection system and a keystone correction method capable of automatically correcting the projection image.

The invention proposes a projection system, which includes a projector, an image capturing device and a processor. The projector has a lens module. The lens module includes a stepper motor. The lens module has a light axis. The projector is configured to project an image to a projection zone along a direction of the light axis. The image capturing device is configured to capture a captured image including the projection zone. The processor is coupled to the image capturing device and the projector. The processor divides the captured image into a plurality of focusing zones and controls the stepper motor to shift focusing on at least the focusing zones at edges of the projection zone so as to obtain a step of the stepper motor for each of the focusing zones and a distance corresponding to the step. A clarity value of the image of each focusing zone with the step of the stepper motor is greater than the clarity value of the image of each focusing zones with other steps of the stepper motor. The distance is a projection distance between the lens module and each focusing zone. The processor calculates an included angle between the direction of the light axis of the projector and the projection zone according to the distances of the focusing zones at the edges of the projection zone, and performs a warping operation on a projection image according to the included angle.

The invention proposes a keystone correction method adapted to a projection system. The projection system includes a projector, an image capturing device and a processor. The projector has a lens module. The lens module includes a stepper motor. The lens module has a light axis.

The processor is coupled to the image capturing device and the projector. The keystone correction method includes: projecting an image to a projection zone along a direction of the light axis by the projector; capturing a captured image including the projection zone by the image capturing device; dividing the captured image into a plurality of focusing zones by the processor; controlling the stepper motor to shift focusing on at least the focusing zones at edges of the projection zone, so as to obtain a step of the stepper motor for each one of the focusing zones and a distance corresponding to the step, wherein a clarity value of the image of each of the focusing zones with the step of the stepper motor is greater than the clarity value of the image of each of the focusing zones with other steps of the stepper motor, and the distance is a projection distance between the lens module and respective one of the focusing zones; and calculating an included angle between the direction of the light axis of the projector and the projection zone according to the distances of the focusing zones at the edges and performing a warping operation on a projection image according to the included angle by the processor.

Based on the above, according to the projection system and the keystone correction method of the invention, the captured image larger than the projection zone is captured and the captured image is then divided into multiple focusing zones. The processor shifts focusing at least on the focusing zones at the edges of the projection zone to obtain the step of the stepper motor when the clarity value is the maximum for each of the focusing zones, and then converts the step into the distance from the focusing zone to the lens module of the projector. Lastly, the processor calculates the included angle between the direction of the light axis of the projector and the projection zone according to the distances from the focusing zones at the edges of the projection zone to the lens module of the projector, and then performs the warping operation on the projection image according to the included.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 3:
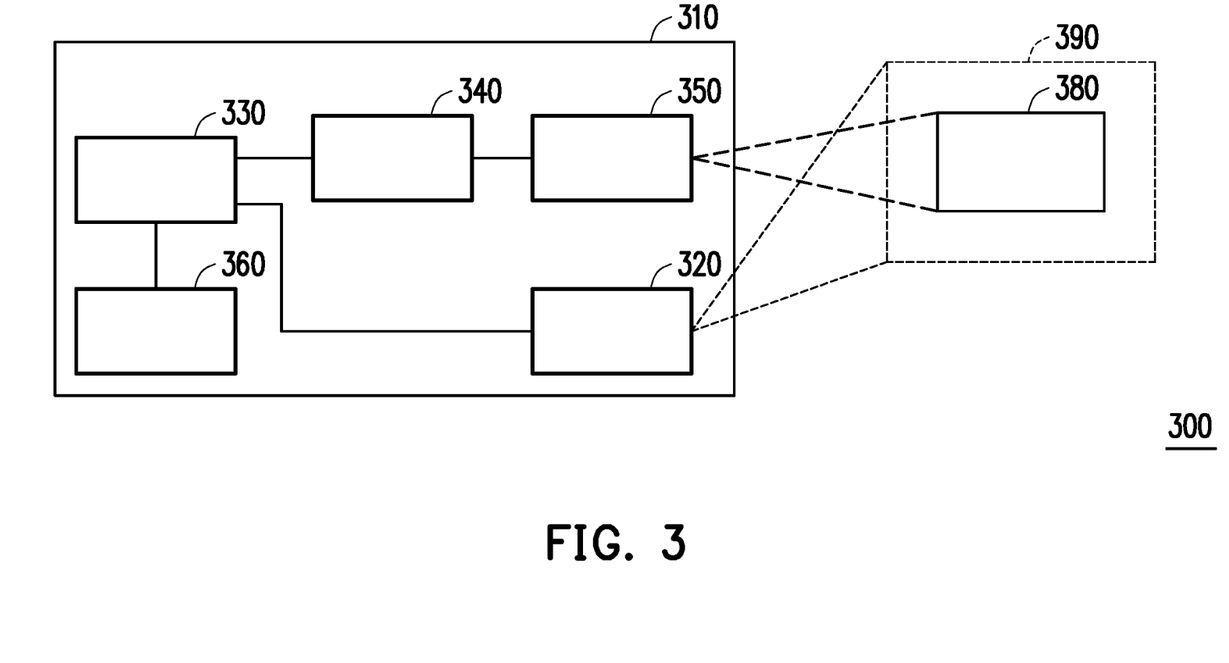
FIG. 3 is a block diagram of a projection system according to an embodiment of the invention.

FIG. 3 is a block diagram of a projection system according to an embodiment of the invention.

With reference to FIG. 3, a projection system 300 of this embodiment includes a projector 310. The projector 310 includes an image capturing device 320, a processor 330, an imaging unit 340, a lens module 350 and a signal input unit 360. The image capturing device 320 is, for example, a complementary metal oxide semiconductor (CMOS) image sensor, a charge coupled device (CCD) image sensor or other similar elements. The processor 330 is, for example, a micro control unit (MCU), a microprocessor, a digital signal processor (DSP) image processor, or other similar elements, or a combination of the above. The imaging unit 340 is, for example, a reflective liquid crystal on silicon (LCOS) or a digital micro-mirror device (DMD); a transmissive spatial light modulator, such as a transparent liquid crystal panel; a self-emissive display panel, such as an organic light emitting diode display panel.

In this embodiment, an image may be formed by the imaging unit 340 and projected to a projection zone 380 along a direction of a light axis of the lens module 350. The lens module 350 may include a stepper motor (not illustrated in the drawing). The image capturing device 320 may capture a captured image 390 including the projection zone 380. In other words, an area of the captured image 390 is greater than an area of the projection zone 380. In an embodiment, the image capturing device 320 is disposed on the projector 310 next to the lens module 350. Here, a direction of a light axis of the image capturing device 320 is parallel to the direction of the light axis of the lens module 350, but not limited thereto. In other embodiments, the image capturing device 320 may be disposed on other positions of the projector 310 or even outside the projector 310 as long as the image capturing device 320 can capture the captured image 390 including the projection zone 380. The signal input unit 360 may receive a source image signal, and the source image signal may be converted into a data format that can be processed by the processor 330 and projected to the projection zone 380 through the imaging unit 340 and the lens module 350. The projection zone 380 is, for example, on a projection screen, on a wall or on other planes that can be projected to.

Figure 4:
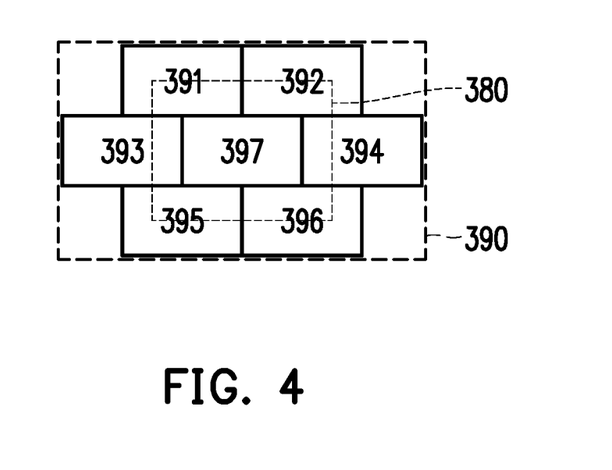
FIG. 4 is a schematic diagram for dividing a captured image into a plurality of focusing zones in the keystone correction method according to an embodiment of the invention.
Figure 5:
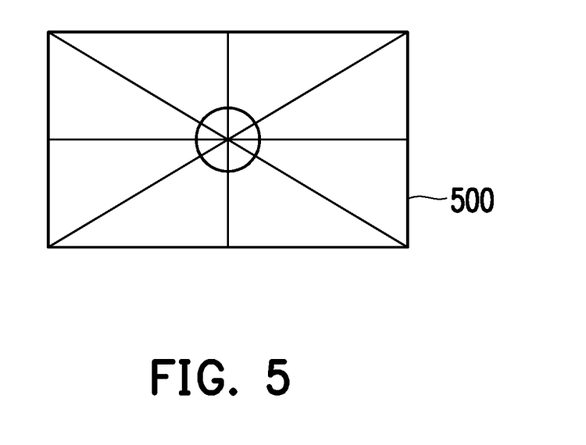
FIG. 5 is a schematic diagram for projecting a focusing pattern in the keystone correction method according to an embodiment of the invention.
Figure 6:
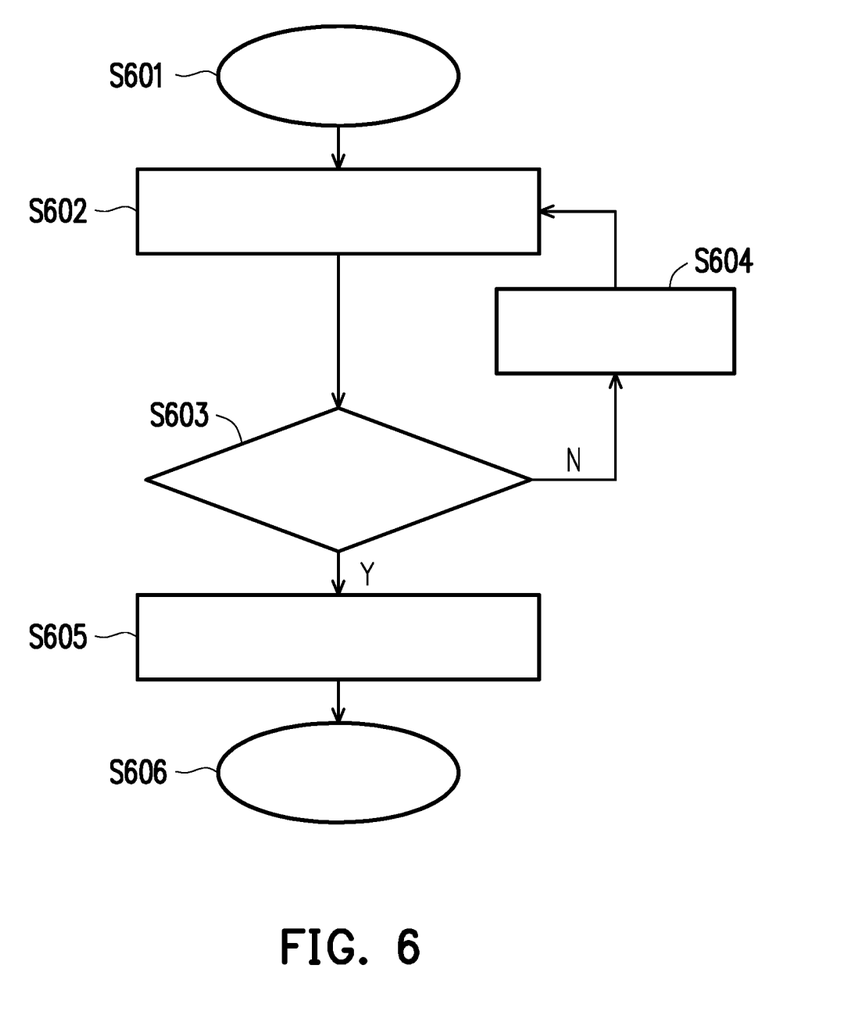
FIG. 6 is a flowchart of an auto focus algorithm according to an embodiment of the invention.

FIG. 4 is a schematic diagram for dividing a captured image into a plurality of focusing zones in the keystone correction method according to an embodiment of the invention. FIG. 5 is a schematic diagram for projecting a focusing pattern in the keystone correction method according to an embodiment of the invention. FIG. 6 is a flowchart of an auto focus algorithm according to an embodiment of the invention.

Referring to FIG. 4 and FIG. 5 together, the processor 330 first divides the captured image 390 into a plurality of focusing zones (e.g., a focusing zone 391 to a focusing zone 397), and after being formed into an image through the imaging unit 340, the image is projected to the projection zone 380 along the direction of the light axis of the lens module 350 by the lens module 350. Here, the image including a focusing pattern 500. It should be noted that, the focusing pattern of FIG. 5 is for illustrative purposes only. In other embodiments, other types of focusing patterns may also be projected. For example, the focusing pattern may be projected at least on edges of the projection zone 380. Next, the processor 330 controls the stepper motor to shift focusing on at least the focusing zones at the edges of the projection zone, so as to obtain a step of the stepper motor and a distance corresponding to the step when a clarity value of the image is the maximum for each of the focusing zones. Here, for each of the focusing zones, the clarity value being the maximum refers to a clarity value of the image with the step of the stepper motor being greater than a clarity value of the image with other steps of the stepper motor. In this embodiment, the processor 330 needs to obtain the steps of the stepper motor for each of the focusing zones 391 to 397 when the clarity value of the image is the maximum for each of the focusing zones 391 to 397. Specifically, a flowchart of an auto focus algorithm for each of the focusing zones 391 to 397 is shown by FIG. 6.

With reference to FIG. 6, in step S601, an auto focus is started.

In step S602, the lens module 350 obtains a clarity value of the image in each of the focusing zones.

In step S603, whether a maximum clarity value is found is determined.

If the maximum clarity value is not found yet, in step S604, the step of the stepper motor is adjusted and the flow returns to step S602.

If the maximum clarity value is found, in step S605, the step of the stepper motor corresponding to the greatest clarity value is recorded.

In step S606, the auto focus is completed.

In this embodiment, the processor 330 can obtain the step of the stepper motor one by one for each of the focusing zones 391 to 397 when the clarity value is the maximum simply by controlling the stepper motor to move from a starting step to a final step. In an embodiment, the starting step and the final step of the stepper motor may correspond to a farthest focus distance and a closest focus distance respectively. In another embodiment, the starting step and the final step of the stepper motor may correspond to the closest focus distance and the farthest focus distance respectively.

After the processor 330 obtains the step of the stepper motor corresponding to the clarity value of the image being the maximum for each of the focusing zones 391 to 397, the processor 330 may obtain the distance between respective one of the focusing zones 391 to 397 and the lens module 350 (e.g., a projection distance) according to a step-distance table stored in advance. The step-distance table may record a corresponding relationship of the step of the stepper motor to the distance. The distance may be regarded as a distance from a predetermined point (e.g., a center point) of respective one of the focusing zones 391 to 397 to a predetermined point of the lens module 350 (e.g., a center point of the lens module 350 or a lens center point).

It should be noted that, although it is described in the foregoing embodiments that the step of the stepper motor and the projection distance are obtained by shift focusing with the stepper motor for each of the focusing zones 391 to 397, the invention is not limited thereto. In another embodiment, the processor 330 may obtain the step of the stepper motor and the projection distance for each of the focusing zone 391 to 396 at the edges of the projection zone 380 only. In this way, a large amount of calculation time can be saved when the processor 330 divides the captured image 390 into the focusing zones and performs subsequent calculations.

Figure 7:
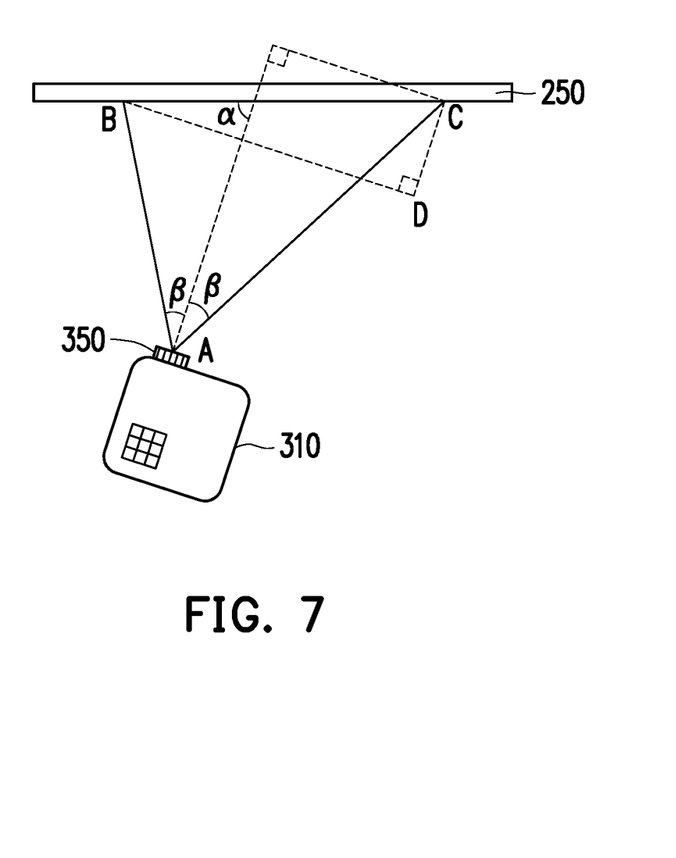
FIG. 7 is a top view of the projector in horizontal rotation according to an embodiment of the invention.

FIG. 7 is a top view of the projector in horizontal rotation according to an embodiment of the invention.

After obtaining the projection distance for each of the focusing zones 391 to 397, the processor 330 may calculate a horizontal included angle α between the direction of the light axis of the lens module 350 and the projection zone 380 (i.e., a projection plane where the projection zone 380 is located).

Specifically, $\overline{BD}=\overline{AB}\times\sin\beta+\overline{AC}\times\sin\beta$.
$\overline{CD}=\overline{AC}\times\cos\beta-\overline{AB}\times\cos\beta$.
From the two equations above, it can be derived that:

$$\frac{\pi}{2} - \alpha = \tan^{-1}\frac{\overline{CD}}{\overline{BD}}.$$

Here, lengths of $\overline{AB}$ and $\overline{AC}$, which may be obtained by checking the step-distance table, may respectively correspond to a distance from the focusing zone 393 (i.e., a left focusing zone) adjacent to a left edge of the projection zone 380 to the lens module 350 and a distance from the focusing zone 394 (i.e., a right focusing zone) adjacent to a right edge of the projection zone 380 to the lens module 350. β is an included angle between $\overline{AB}$ (i.e., a line corresponding to a maximum light emitting range) and the light axis of the lens module 350. Because the maximum light emitting angle of the lens module 350 is affected by a light source and the lens module 350 and the projector 310 has determined the light source and the lens module 350 to be used at the time of shipment, β may be a factory setting value of the projector 310. Therefore, after obtaining the horizontal included angle α, the processor 330 may then perform a horizontal keystone correction on the projection zone 380 according to the horizontal included angle α.

Similar to the horizontal keystone method, the processor 330 may also calculate a vertical included angle between the direction of the light axis of the lens module 350 and the projection zone 380, and perform a vertical keystone correction on the projection zone according to the vertical included angle. The processor 330 may calculate the vertical included angle according to a distance from the focusing zone 391 (i.e., an upper focusing zone) to the lens module 350 and a distance from the focusing zone 395 (i.e., a lower focusing zone) to the lens module 350, or calculate the vertical included angle according to a distance from the focusing zone 392 (i.e., the upper focusing zone) to the lens module 350 and a distance from the focusing zone 396 (i.e., the lower focusing zone) to the lens module 350. In brief, the processor 330 may calculate the horizontal included angle according to the distances from the left focusing zone and the right focusing zone located on the horizontal plane to the lens module 350, and calculate the vertical included angle according to the distances from the upper focusing zone and the lower focusing zone located on the same vertical plane to the lens module 350. When the processor 330 divides the captured image 390 into more focusing zones, the calculated horizontal included angle α and/or the vertical included angle is more accurate.

After the processor 330 has obtained the horizontal included angle α and/or the vertical included angle, the processor 330 may perform a warping operation on the source image signal according to the horizontal included angle α and/or the vertical included angle, so as to project the rectangular projection image on the projection screen.

Figure 8:
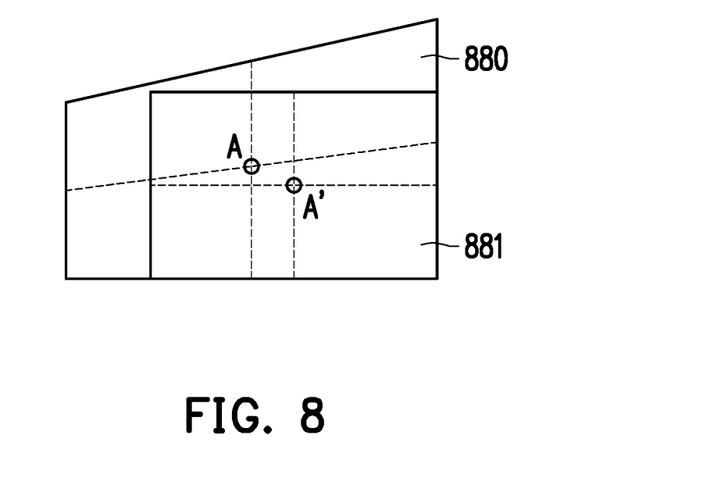
FIG. 8 and FIG. 9 are schematic diagrams of an auto focus performed after a projection correction according to an embodiment of the invention.
Figure 9:
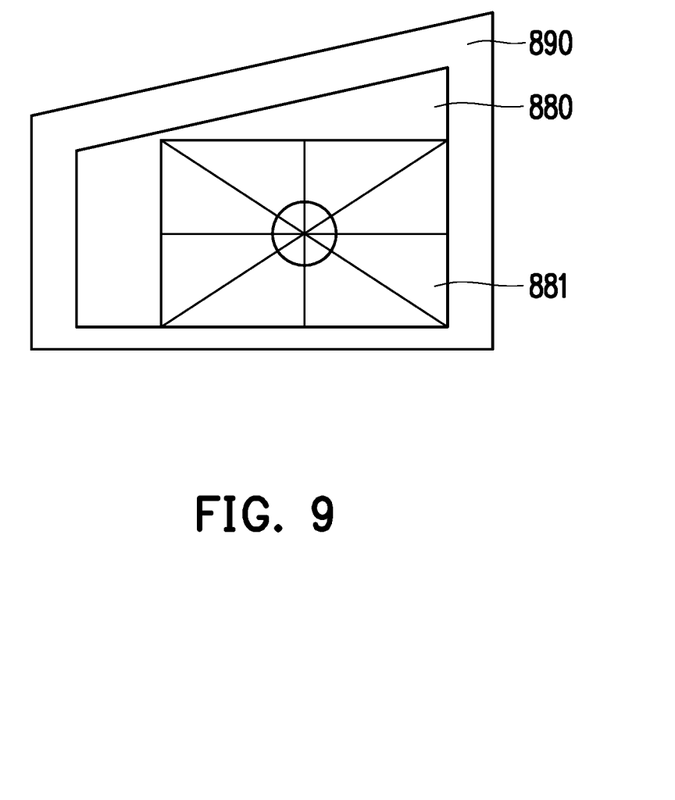

FIG. 8 and FIG. 9 are schematic diagrams of an auto focus performed after a projection correction according to an embodiment of the invention.

With reference to FIG. 8 and FIG. 9, after the horizontal keystone correction and/or the vertical keystone correction are performed, if the processor 330 still performs the auto focus using an uncorrected image zone 880 (e.g., perform focusing according to a center point A of the uncorrected image zone 880), a corrected image zone 881 having a center point A' will be out of focus. Here, a periphery of the uncorrected image zone 880 is a captured image 890 captured by the image capturing device 320. Accordingly, after performing the horizontal keystone correction and/or the vertical keystone correction, the processor 330 may project one focusing pattern to the corrected image zone 811 as shown by FIG. 9 so the lens module 350 can detect a location of the corrected image zone and performs focusing on the focusing pattern. Accordingly, the problem that the projection image is out of focus after the warping operation (e.g., the horizontal keystone correction and/or the vertical keystone correction) are performed can be solved.

In summary, according to the projection system and the keystone correction method of the invention, the captured image larger than the projection zone is captured and the captured image is then divided into multiple focusing zones. The processor shifts focusing at least on the focusing zones at the edges of the projection zone through the stepper motor to obtain the step of the stepper motor when the clarity value of the image is the maximum for each of the focusing zones, and then converts the step into the distance from the focusing zone to the lens module of the projector. Lastly, the processor calculates the included angle between the direction of the light axis of the projector and the projection zone according to the distances from the focusing zones at the edges of the projection zone to the lens module of the projector, and then performs the warping operation on the projection image according to the included. After performing the warping operation on the projection image, the processor further refocuses the warped projection image so as to solve the problem that the focusing is incorrect after the warping operation is performed.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection system, comprising a projector, an image capturing device and a processor, wherein:
   the projector has a lens module, and the lens module comprises a stepper motor, wherein the lens module has a light axis, and the projector is configured to project an image to a projection zone along a direction of the light axis;

the image capturing device is configured to capture a captured image including both the projection zone and an area outside the projection zone; and the processor is coupled to the projector and the image capturing device, wherein the processor divides the captured image into a plurality of focusing zones, and controls the stepper motor to shift focusing at least on each of the focusing zones at edges of the projection zone by controlling the stepper motor to move from a starting step to a final step at a time, so as to obtain both a step of the stepper motor and a distance corresponding to the step for each of the focusing zones, wherein a clarity value of the image with the step of the stepper motor is greater than a clarity value of the image with other steps of the stepper motor for each of the focusing zones, the distance is a projection distance between the lens module and respective one of the focusing zones, and the processor calculates an included angle between the direction of the light axis of the projector and the projection zone according to distances between the lens module and the focusing zones at the edges of the projection zone, and the processor performs a warping operation on a projection image according to the included angle.

2. The projection system according to claim 1, wherein the lens module refocuses the projection image underwent the warping operation.

3. The projection system according to claim 1, wherein the focusing zones comprises a left focusing zone adjacent to a left edge of the projection zone and a right focusing zone adjacent to a right edge of the projection zone, and the processor calculates a horizontal included angle between the direction of the light axis and the projection zone according to the distance between the left focusing zone, and the lens module and the distance between the right focusing zone and the lens module and performs the warping operation on the projection image according to the horizontal included angle.

4. The projection system according to claim 1, wherein the focusing zones comprises an upper focusing zone adjacent to an upper edge of the projection zone and a lower focusing zone adjacent to a lower edge of the projection zone, and the processor calculates a vertical included angle between the direction of the light axis and the projection zone according to the distance between the upper focusing zone and the lens module and the distance between the lower focusing zone and the lens module and performs the warping operation on the projection image according to the vertical included angle.

5. The projection system according to claim 1, wherein the projector obtains the distance corresponding to the step for each of the focusing zones according to a step-distance table.

6. The projection system according to claim 1, wherein the image comprises a focusing pattern, and the focusing pattern is displayed on at least the edges of the projection zone.

7. A keystone correction method, adapted to a projection system, wherein the projection system comprises a projector, an image capturing device and a processor, the projector having a lens module, the lens module comprising a stepper motor, the lens module having a light axis, the processor being coupled to the projector and the image capturing device, the keystone correction method comprising:

projecting an image to a projection zone along a direction of the light axis by the projector;

capturing a captured image including both the projection zone and an area outside the projection zone by the image capturing device;

dividing the captured image into a plurality of focusing zones by the processor;

controlling the stepper motor to shift focusing at least on each of the focusing zones at edges of the projection zone by controlling the stepper motor to move from a starting step to a final step at a time, so as to obtain both a step of the stepper motor and a distance corresponding to the step for each of the focusing zones, wherein a clarity value of the image with the step of the stepper motor is greater than a clarity value of the image with other steps of the stepper motor for each of the focusing zones, the distance is a projection distance between the lens module and respective one of the focusing zones; and calculating an included angle between the direction of the light axis of the projector and the projection zone according to distances between the lens module and the focusing zones at the edges of the projection zone by the processor, and performing a warping operation on a projection image according to the included angle by the processor.

8. The keystone correction method according to claim 7, wherein the lens module refocuses the projection image underwent the warping operation.

9. The keystone correction method according to claim 7, wherein the focusing zones comprises a left focusing zone adjacent to a left edge of the projection zone and a right focusing zone adjacent to a right edge of the projection zone, and the processor calculates a horizontal included angle between the direction of the light axis and the projection zone according to the distance between the left focusing zone and the lens module and the distance between the right focusing zone and the lens module and performs the warping operation on the projection image according to the horizontal included angle.

10. The keystone correction method according to claim 7, wherein the focusing zones comprises an upper focusing zone adjacent to an upper edge of the projection zone and a lower focusing zone adjacent to a lower edge of the projection zone, and the processor calculates a vertical included angle between the direction of the light axis and the projection zone according to the distance between the upper focusing zone and the lens module and the distance between the lower focusing zone and the lens module and performs the warping operation on the projection image according to the vertical included angle.

11. The keystone correction method according to claim 7, wherein the projector obtains the distance corresponding to the step for each of the focusing zones according to a step-distance table.

12. The keystone correction method according to claim 7, wherein the image comprises a focusing pattern, and the focusing pattern is displayed on at least the edges of the projection zone.

* * * * *